United States Patent [19]

Watanabe et al.

[11] Patent Number: 4,910,171
[45] Date of Patent: Mar. 20, 1990

[54] TITANIUM HAFNIUM CARBIDE-BORIDE METAL BASED CERAMIC SINTERED BODY

[75] Inventors: Tadahiko Watanabe; Kazuhisa Shobu, both of Saga; Hideki Yamamoto, Fukuoka, all of Japan

[73] Assignee: Agency of Industrial Science and Technology, Tokyo, Japan

[21] Appl. No.: 355,883

[22] Filed: May 23, 1989

Related U.S. Application Data

[63] Continuation of Ser. No. 30,947, Mar. 26, 1987, abandoned.

[51] Int. Cl.$^4$ .................. C04B 35/56; C04B 35/58
[52] U.S. Cl. ........................... 501/87; 501/96; 51/307
[58] Field of Search ............ 501/87, 96; 51/307

[56] References Cited

U.S. PATENT DOCUMENTS

| | | | |
|---|---|---|---|
| 3,433,471 | 3/1969 | Alper | 501/98 |
| 4,108,670 | 8/1978 | Steiger et al. | 501/90 |
| 4,132,534 | 1/1979 | Valdsaar | 501/87 |
| 4,451,292 | 5/1984 | Hall et al. | 75/238 |
| 4,515,746 | 5/1985 | Brun et al. | 501/93 |

FOREIGN PATENT DOCUMENTS

| | | | |
|---|---|---|---|
| 257035 | 8/1963 | Australia | 501/96 |
| 1811513 | 6/1970 | Fed. Rep. of Germany | 501/87 |
| 60-16867 | 1/1985 | Japan | 501/93 |
| 60-155571 | 8/1985 | Japan | 501/87 |

*Primary Examiner*—Mark L. Bell
*Attorney, Agent, or Firm*—Jordan and Hamburg

[57] ABSTRACT

The present invention is characterized by a ceramic sintered body consisting of (1) a primary mixed powder in which boride metal powder the $MB_2$ type or $M_2B_5$ type (M indicates the metal) is mixed with a titanium hafnium carbide powder; (2) a secondary mixed powder in which titanium carbonitride is mixed with the above-mentioned primary mixed powder; or (3) a tertiary mixed powder or a quaternary mixed powder in which carbide powder such as hafnium carbide or zirconium carbide is mixed with above-mentioned primary mixed powder or the secondary mixed powder. The resulting sintered bodies have high hardness and toughness.

12 Claims, No Drawings

TITANIUM HAFNIUM CARBIDE-BORIDE METAL BASED CERAMIC SINTERED BODY

This application is a continuation, of application Ser. No. 030,947, filed Mar. 26, 1987, now abandoned.

BACKGROUND OF THE INVENTION

The present invention relates to titanium hafnium carbide-boride metal-based ceramic sintered bodies having a high hardness and toughness for use as materials for cutting tools or mechanical members.

Hafnium carbide is chemically suitable and has a lot of excellent properties, but is not widely used as an industrial materials since hafnium carbide is not easily sintered and is expensive.

Titanium hafnium carbide is well-known as a material which does not damage the excellent property of the above-mentioned hafnium carbide, is inexpensive and has a good sinterability. Titanium hafnium carbide has a high melting point, hardness and wear resistance, and is expected as a material for cutting tools or wear-resistant mechanical members. However, a sintered body of titanium hafnium carbide itself has a low transverse rupture strength and toughness to. Accordingly titanium hafnium carbide still has not been put into practical use.

SUMMARY OF THE INVENTION

It is an object of the present invention to provide a sintered body having a high toughness and strength in which the defects of the above-mentioned titanium hafnium carbide are solved.

For the purpose of achieving the above-mentioned object, various ceramic powders are mixed with titanium hafnium carbide. It has been found that boride metal of the $MB_2$ type or $M_2B_5$ type (M designates a metal) is desirable as a ceramic powder for mixing, as evidenced by examining the properties of the obtained sintered body. The present invention has been developed in light of the above-mentioned findings.

DETAILED DESCRIPTION OF THE PREFERRED EMBODIMENTS

The present invention is explained in detail as follows: A titanium hafnium carbide-boride metal-based ceramic material (hereinafter the "primary invention") is prepared by sintering a powdery mixture consisting essentially of:
  (a) a titanium hafnium carbide powder in which the ratio of atomic weight of titanium and hafnium is from 99:1 to 1:99, and
  (b) from 5 to 95% by weight of at least one metal boride selected from the group consisting of $TiB_2$, $CrB_2$, $TaB_2$, $MnB_2$, $MoB_2$, $VB_2$, $NbB_2$, $HfB_2$, $AlB_2$, $ZrB_2$, $W_2B_5$ and $Mo_2B_5$.

A ceramic material (hereinafter the "secondary invention") is prepared by sintering a powdery mixture consisting essentially of:
  (a) the components of the primary invention, and
  (b) less than 80% by weight (0 is not included) of $TiC_\alpha N_\beta$ powder in which the ratio of the weight of $\alpha:\beta$ ranges from 0:100 to 100:0.

A ceramic material (hereinafter the "tertiary or quaternary invention") is prepared by sintering a powdery mixture consisting essentially of:
  (a) the components of the primary invention or the secondary invention, and
  (b) less than 70% by weight (0 is not included) of at least one carbide powder selected from the group consisting of hafnium carbide, zirconium carbide, vanadium carbide, niobium carbide, tantalic carbide, molybdenum carbide and tungsten carbide.

The above-mentioned tertiary invention or quaternary invention has the same or higher transverse rupture strength and toughness as the primary invention or secondary invention.

In titanium hafnium carbide used in the present invention, the ratio of atomic weight of titanium and hafnium ranges from 99:1 to 1:99 according to use. As the powders, fine powders having mean particles less than 2 $\mu m$, and further less than 1 $\mu m$, are desirable. If the amount of metal boride added is less than 5% by weight, the development of the strength of the obtained sintered body is not observed and if it is more than 95% by weight, advantages which are basically possessed by titanium hafnium carbide disappear, and the strength of the obtained sintered body decrease because the ratio of titanium hafnium carbide decreases too much. Therefore, from 5 to 95% by weight per the total amount of metal boride is desirable.

$TiC_\alpha N_\beta$ used in the secondary invention of the present invention has a range of the ratio of atomic weight of $\alpha$ (carbon) and $\beta$ (nitrogen) of from 0:100 to 100:0 and consists of at least one titanium carbonitride consisting of TiC, TiN or combination of carbide and nitride in various ratios. The desirable amount of carbonitride added less than 80% by weight because if the amount exceeds 80% by weight per the total amount, the hardness of the sintered body increases. A carbide such as hafnium carbide or zirconium carbide used in the tertiary and quaternary inventions of the present invention helps to increase the sinterability of materials. However the strength of the sintered body is decreased if the added amount of a carbide is too much. Therefore, the addition of less than 70% by weight is desirable.

A ceramic sintered body of the present invention is a mixture of each of the above-mentioned components and can be produced by methods already well-known.

For example, a raw powder mixture is packed in a metal mold, the packed mixture is cold-pressed by a press at around from 0.5 to 10 ton/$cm^2$ and is formed by a lubber press and further by hydrostatic pressure at around from 0.5 to 10 ton/$cm^2$. The forming is done either by a lubber press or by hydrostatic pressure. A slip casting process can also be employed as the forming step. The compact body obtained by the above-mentioned forming is then sintered in a nonoxidizing atmosphere at from 1400° to 2300° C. for from 30 to 300 minutes. If further necessary, the compact is sintered under the condition of less than 2 ton/$cm^2$ in argon gas by a hot hydrostatic pressure firing method at from 1300° to 2000° C. for from 5 to 300 minutes.

According to an other process, a raw powdery mixture is packed in a graphite mold. The packed mixture is sintered in a vacuum or under hydrostatic pressure in argon or hydrogen and from 50 to 300 kg/$cm^2$ of die pressure at from 1300° to 2300° C. for from 10 to 200 minutes. This is called hot pressing.

As mentioned above, a desirable ceramic sintered body for cutting tools, etc., is obtained.

Embodiments of the present invention will now be further exemplified along with comparative examples.

EMBODIMENT 1

Specimens consisting of raw materials mixed in various ratios shown in the following Table 1 are formed to a compact with a metal mold and lubber press (3 ton/cm$^2$). Each compact body is sintered at atmospheric pressure for 90 minutes under the condition shown in Table 1, the properties of the obtained sintered bodies are determined, and the results are also shown in Table 1. The states of pores in the structure are observed by an electron microscope Specimen Nos. 1-1, 1-4, 1-5, 1-19 and 1-24 marked with an asterisk (*) in Table 1 are comparative examples.

TABLE 1

| Specimens | | Condition of the sintered body | | Properties of the sintered body | | | |
|---|---|---|---|---|---|---|---|
| No. | Components (% by weight) | Sintering temperature (°C.) | Atomosphere | Transverse rupture strength (kg/mm$^2$) | Hardness HV in room temperature (kg/mm$^2$) | Toughness Krc (MP a m$\frac{1}{2}$) | States of pores in the structure |
| 1-1 | *70HfC—30TiB$_2$ | 2000 | argon | 30 | | | large amount |
| 1-2 | 70(Ti$_5$Hf$_5$)C-30TiB$_2$ | 2100 | argon | 60 | | | none |
| 1-3 | 70(Ti$_8$Hf$_2$)C-30TiB$_2$ | 2200 | argon | 70 | 2200 | 4.0 | none |
| 1-4 | *70TiC-30TiB$_2$ | 2000 | argon | 70 | | | none |
| 1-5 | *100(Ti$_8$Hf$_2$)C | 2100 | argon | 25 | | | large amount |
| 1-6 | 95(Ti$_8$Hf$_2$)C-5TiB$_2$ | 2200 | argon | 55 | | | small amount |
| 1-7 | 40(Ti$_8$Hf$_2$)C-60TiB$_2$ | 2200 | argon | 60 | | | none |
| 1-8 | 5(Ti$_8$Hf$_2$)C-95TiB$_2$ | 2200 | argon | 50 | | | small amount |
| 1-9 | 70(Ti$_8$Hf$_2$)C-30TiB$_2$ | 2200 | argon | 70 | | | none |
| 1-10 | 70(Ti$_8$Hf$_2$)C-30TiB$_2$ | 2200 | argon | 70 | | | none |
| 1-11 | 65(Ti$_8$Hf$_2$)C-30TiB$_2$-3TaB$_2$ | 2100 | argon | 80 | 2300 | 4.0 | none |
| 1-12 | 65(Ti$_8$Hf$_2$)C-30TiB$_2$-5NbB$_2$ | 2100 | argon | 80 | | | none |
| 1-13 | 65(Ti$_8$Hf$_2$)C-30ZrB$_2$-5HfB$_2$ | 2100 | argon | 80 | | | none |
| 1-14 | 65(Ti$_8$Hf$_2$)C-30TiB$_2$-5ZrC | 2000 | vaccum | 70 | 2300 | 4.0 | none |
| 1-15 | 60(Ti$_8$Hf$_2$)C-30TiB$_2$-10TiC | 2000 | vaccum | 70 | | | none |
| 1-16 | 65(Ti$_8$Hf$_2$)C-30TiB$_2$-5VC | 2000 | vaccum | 70 | | | none |
| 1-17 | 60(Ti$_8$Hf$_2$)C-30TiB$_2$-10TaC | 2000 | vaccum | 70 | | | none |
| 1-18 | 60(Ti$_8$Hf$_2$)C-30TiB$_2$-10NbC | 2000 | vaccum | 70 | | | none |
| 1-19 | *50(Ti$_8$Hf$_2$)C-50Ti(C$_5$N$_5$) | 1800 | argon | 40 | | | large amount |
| 1-20 | 40(Ti$_8$Hf$_2$)C-40Ti(C$_5$N$_5$)-20TiB$_2$ | 1800 | argon | 70 | | | none |
| 1-21 | 35(Ti$_8$Hf$_2$)C-35Ti(C$_5$N$_5$)-30TiB$_2$ | 1800 | argon | 70 | | | none |
| 1-22 | 25(Ti$_8$Hf$_2$)C-35Ti(C$_5$N$_5$)-50TiB$_2$ | 1800 | argon | 60 | | | none |
| 1-23 | 15(Ti$_8$Hf$_2$)C-15Ti(C$_5$N$_5$)-70TiB$_2$ | 1800 | argon | 70 | 2399 | 4.0 | none |
| 1-24 | *70Ti(C$_5$N$_5$)-30TiB$_2$ | 1800 | argon | | | | |

EMBODIMENT 2

Specimens consisting of raw materials mixed in various ratios shown in the following Table 2 are packed in a graphite mold and sintered by hot pressing under the conditions shown in Table 2 for 60 minutes. The properties of the obtained sintered bodies are also shown in Table 2. The states of pores in the sintered body are also observed by an electron microscope. Specimen Nos. 2-4 and 2-18 marked with an asterisk (*) in Table 2 are comparative examples.

TABLE 2

| Specimens | | Condition of the sintered body | | Properties of the sintered body | | | |
|---|---|---|---|---|---|---|---|
| No. | Components (% by weight) | Sintering temperature (°C.) | Sintering pressure (kg/mm$^2$) | Transverse rupture strength (kg/mm$^2$) | Hardness HV in room temperature (kg/mm$^2$) | Toughness Krc (MPa m$\frac{1}{2}$) | States of pores in the structure |
| | | | | Atmosphere: vacuum | | | |
| 2-1 | 70(Ti$_8$Hf$_2$)C-30TiB$_2$ | 1800 | 200 | 75 | | | none |
| 2-2 | 70(Ti$_5$Hf$_5$)C-30TiB$_2$ | 1800 | 200 | 75 | | | none |
| 2-3 | 35(Ti$_5$Hf$_5$)C-35(Ti$_8$Hf$_2$)C-30TiB$_2$ | 1800 | 200 | 75 | | | none |
| 2-4 | *50(Ti$_8$Hf$_2$)C-50(Ti$_5$N$_5$) | 1700 | 200 | 40 | 1000 | | present |
| 2-5 | 35(Ti$_8$Hf$_2$)C-35Ti(C$_5$N$_5$)-30TiB$_2$ | 1800 | 200 | 120 | 2400 | 3.5 | none |
| 2-6 | 35*Ti$_8$Hf$_2$)C-35Ti(C$_5$N$_5$)-30TiB$_2$ | 1700 | 200 | 120 | 2350 | 4.0 | none |
| 2-7 | 35(Ti$_8$Hf$_2$)C-35Ti(C$_5$N$_5$)-30TiB$_2$ | 1600 | 200 | 120 | 2350 | 4.0 | none |
| 2-8 | 70(Ti$_8$Hf$_2$)C-30TiB$_2$ | 1700 | 200 | 40 | | | small amount |
| 2-9 | 70(Ti$_8$Hf$_2$)C-30TiB$_2$ | 1600 | 200 | 30 | | | small amount |
| 2-10 | 65(Ti$_8$Hf$_2$)C-5Ti(C$_5$N$_5$)-30TiB$_2$ | 1700 | 200 | 70 | 1800 | | small amount |
| 2-11 | 60(Ti$_8$Hf$_2$)C-10Ti(C$_5$N$_5$)-30TiB$_2$ | 1700 | 200 | 80 | 2500 | 4.0 | none |
| 2-12 | 50(Ti$_8$Hf$_2$)C-20Ti(C$_5$N$_5$)-30TiB$_2$ | 1700 | 200 | 90 | 2400 | 4.0 | none |
| 2-13 | 45(Ti$_8$Hf$_2$)C-25Ti(C$_5$N$_5$)-30TiB$_2$ | 1700 | 200 | 100 | 2350 | 4.0 | none |
| 2-14 | 40(Ti$_8$Hf$_2$)C-30Ti(C$_5$N$_5$)-30TiB$_2$ | 1700 | 200 | 120 | 2350 | 4.0 | none |
| 2-15 | 10(Ti$_8$Hf$_2$)C-60Ti(C$_5$N$_5$)-30TiB$_2$ | 1700 | 200 | 120 | 2350 | 4.0 | none |
| 2-16 | 5(Ti$_8$Hf$_2$)C-65Ti(C$_5$N$_5$)-30TiB$_2$ | 1700 | 200 | 120 | 2300 | 4.0 | none |
| 2-17 | 1(Ti$_8$Hf$_2$)C-69Ti(C$_5$N$_5$)-30TiB$_2$ | 1700 | 200 | 110 | 2300 | 4.0 | none |
| 2-18 | *70Ti(C$_5$N$_5$)-30TiB$_2$ | 1700 | 200 | 90 | 2300 | 3.0 | none |
| 2-19 | 35Ti$_8$Hf$_2$)C-35TiC-30TiB$_2$ | 1700 | 200 | 40 | 1900 | 3.0 | none |
| 2-20 | 35(Ti$_8$Hf$_2$)C-35TiN-30TiB$_2$ | 1700 | 200 | 120 | 2500 | 4.0 | none |
| 2-21 | 35(Ti$_5$Hf$_5$)C-35Ti(C$_5$N$_5$)-30TiB$_2$ | 1700 | 200 | | | | |

According to the above-mentioned present invention, the transerve rupture strength markedly increases compared with the sintered body consisting of only titanium hafnium carbide. That is, a transverse rupture strength of the sintered body consisting of only titanium hafnium carbide (Specimen No. 1-5 in Table 1) is only 25 kg/mm$^2$, and lots of pores are observed in the structure of the sintered body. The material in the present invention has a fairly high degree of transverse rupture strength compared with the above-mentioned sintered body, pores are not observed in the structure, and the hardness and the toughness are both excellent.

Accordingly, the sintered body of the present invention has excellent hardness and strength, and is used for various purposes while retaining the advantages of inexpensive cost and good sinterability which are properties of titanium hafnium carbide.

What is claimed is:

1. A titanium hafnium carbide-boride metal-base ceramic sintered body for use as a cutting tool and mechanical member prepared by sintering a powdery mixture consisting essentially of:
   (a) a titanium hafnium carbide solid solution having a ratio of atomic weight of titanium to hafnium of from 99:1 to 1:99, and
   (b) from 5 to 95% by weight of at least one boride metal selected from the group consisting of $TiB_2$, $CrB_2$, $TaB_2$, $MnB_2$, $MoB_2$, $VB_2$, $NbB_2$, $HfB_2$, $AlB_2$, $ZrB_2$, $W_2B_5$ and $Mo_2B_5$,
said powdery mixture having a mean particle size of less than 2 μm and said ceramic sintered body having substantially no pores observable by electron microscope.

2. A titanium hafnium carbide-boride metal-based ceramic sintered body for use as a cutting tool and mechanical member prepared by sintering a powdery mixture consisting essentially of:
   (a) a titanium hafnium carbide solid solution having a ratio of atomic weight of titanium to hafnium of from 99:1 to 1:99,
   (b) from 5 to 95% by weight of at least one boride metal selected from the group consisting of $TiB_2$, $CrB_2$, $TaB_2$, $MnB_2$, $MoB_2$, $VB_2$, $NbB_2$, $HfB_2$, $AlB_2$, $ZrB_2$, $W_2B_5$ and $Mo_2B_5$, and
   (c) greater than 0% but less than 80% by weight of a $TiC_\alpha N_\beta$ powder wherein $\alpha:\beta$ ranges from 0:100 to 100:0,
said powdery mixture having a mean particle size of less than 2 μm and said ceramic sintered body having substantially no pores observable by electron microscope.

3. A titanium hafnium carbide-boride metal-based ceramic sintered body for use as cutting tool and mechanical member prepared by sintering a powdery mixture consisting essentially of:
   (a) a titanium hafnium carbide solid solution having a ratio of atomic weight of titanium to hafnium of from 99:1 to 1:99,
   (b) from 5 to 95% by weight of at least one boride metal selected from the group consisting of $TiB_2$, $CrB_2$, $TaB_2$, $MnB_2$, $MoB_2$, $VB_2$, $NbB_2$, $HfB_2$, $AlB_2$, $ZrB_2$, $W_2B_5$ and $Mo_2B_5$, and
   (c) greater than 0% but less than 70% by weight of at least one carbide powder selected from the group consisting of hafnium carbide, zirconium carbide, vanadium carbide, niobium carbide, tantalic carbide, molybdenum carbide and tungsten carbide,
said powdery mixture having a mean particle size of less than 2 μm and said ceramic sintered body having substantially no pores observable by electron microscope.

4. A titanium hafnium carbide-boride metal-based ceramic sintered body for use as a cutting tool and mechanical member prepared by sintering a powdery mixture consisting essentially of:
   (a) a titanium hafnium carbide solid solution having a ratio of atomic weight of titanium to hafnium of from 99:1 to 1:99,
   (b) from 5 to 95% by weight of at least one boride metal selected from the group consisting of $TiB_2$, $CrB_2$, $TaB_2$, $MnB_2$, $MoB_2$, $VB_2$, $NbB_2$, $HfB_2$, $AlB_2$, $ZrB_2$, $W_2B_5$ and $Mo_2B_5$,
   (c) greater than 0% but less than 80% by weight of a $TiC_\alpha N_\beta$ powder wherein $\alpha:\beta$ ranges from 0:100 to 100:0, and
   (d) greater than 0% but less than 70% by weight of at least one carbide powder selected from the group consisting of hafnium carbide, zirconium carbide, vanadium carbide, niobium carbide, tantalic carbide, molybdenum carbide and tungsten carbide,
said powdery mixture having a mean particle size of less than 2 μm and said ceramic sintered boby having substantially no pores observable by electron microscope.

5. A titanium hafnium carbide-boride metal-based ceramic sintered body according to claim 1, wherein said powdery mixture has a mean particle size of less than 1 μm.

6. A titanium hafnium carbide-boride metal-based ceramic sintered body according to claim 2, wherein said powdery mixture has a mean particle size of less than 1 μm.

7. A titanium hafnium carbide-boride metal-based ceramic sintered body according to claim 3, wherein said powdery mixture has a mean particle size of less than 1 μm.

8. A titanium hafnium cabide-boride metal-based ceramic sintered body according to claim 4, wherein said powdery mixture has a mean particle size of less than 1 μm.

9. A titanium hafnium carbide-boride metal-based ceramic sintered body according to claim 1, wherein said sintered body has a transverse rupture strength of 80 to 120 kg/mm$^2$.

10. A titanium hafnium carbide-boride metal-based ceramic sintered body according to claim 2, wherein said sintered body has a transverse rupture strength of 80 to 120 kg/mm$^2$.

11. A titanium hafnium carbide-boride metal-based ceramic sintered body according to claim 3, wherein said sintered body has a transverse rupture strength of 80 to 120 kg/mm$^2$.

12. A titanium hafnium carbide-boride metal-based ceramic sintered body according to claim 4, wherein said sintered body has a transverse rupture strength of 80 to 120 kg/mm$^2$.

* * * * *